US011271615B2

(12) United States Patent
Wang et al.

(10) Patent No.: US 11,271,615 B2
(45) Date of Patent: Mar. 8, 2022

(54) COMMUNICATIONS METHOD AND APPARATUS

(71) Applicant: HUAWEI TECHNOLOGIES CO., LTD., Guangdong (CN)

(72) Inventors: Daowei Wang, Shanghai (CN); Jiang Guo, Shanghai (CN); Zhe Zhang, Chengdu (CN); Xiaobo Yang, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/215,387

(22) Filed: Mar. 29, 2021

(65) Prior Publication Data
US 2021/0218441 A1 Jul. 15, 2021

Related U.S. Application Data

(63) Continuation of application No. PCT/CN2019/107574, filed on Sep. 24, 2019.

(30) Foreign Application Priority Data

Sep. 29, 2018 (CN) .......................... 201811151606.X

(51) Int. Cl.
 H04B 7/06 (2006.01)
 H04B 7/0413 (2017.01)
(52) U.S. Cl.
 CPC ......... *H04B 7/0413* (2013.01); *H04B 7/0615* (2013.01)
(58) Field of Classification Search
 CPC .. H04W 72/042; H04W 52/42; H04B 7/0413; H04B 7/0634; H04B 7/0615
 See application file for complete search history.

(56) References Cited

U.S. PATENT DOCUMENTS

2010/0210227 A1    8/2010  Hwang et al.
2011/0135033 A1*   6/2011  Ko ................. H04B 7/0413
                                                 375/295
(Continued)

FOREIGN PATENT DOCUMENTS

CN    1809980 A      7/2006
CN    101488794 A    7/2009
(Continued)

OTHER PUBLICATIONS

Office Action issued in Chinese Application No. 201811151606.X dated Aug. 21, 2020, 13 pages (with English translation).
(Continued)

*Primary Examiner* — Rahel Guarino
(74) *Attorney, Agent, or Firm* — Fish & Richardson P.C.

(57) ABSTRACT

Example communications methods and apparatus are described. One example method includes generating a first signal by a base station. The base station performs cyclic delay diversity (CDD) weighted processing on the first signal to obtain a second signal, and performs densified beam weighted processing on the second signal to obtain a third signal. The third signal is sent by the base station via an antenna. According to the foregoing method, the CDD weighted processing is performed on the first signal generated by the base station, so that time diversity can be obtained when the first signal is transmitted. In addition, the densified beam weighted processing is performed on the second signal obtained after the CDD weighted processing, so that a quantity of beams scanned by the base station can be increased.

12 Claims, 9 Drawing Sheets

(56) References Cited

U.S. PATENT DOCUMENTS

2018/0048365 A1 2/2018 Yoo et al.
2018/0331746 A1* 11/2018 Okuyama .............. H04B 7/063

FOREIGN PATENT DOCUMENTS

| CN | 101778072 A | 7/2010 |
| CN | 102316470 A | 1/2012 |
| EP | 1887713 A2 | 2/2008 |
| WO | 2009039678 A1 | 4/2009 |

OTHER PUBLICATIONS

PCT International Search Report and Written Opinion issued in International Application No. PCT/CN2019/107574 dated Dec. 20, 2019, 13 pages (with English translation).
Dammann et al., "Beamforming in Combination with Space-Time Diversity for Broadband OFDM Systems," 2002 IEEE International Conference on Communications. Conference Proceedings. ICC 2002, Apr. 2002, 8 pages.
Extended European Search Report issued in European Application No. 19867326.1 dated Oct. 5, 2021, 12 pages.
Huawei, HiSilicon, "Access mechanism for beam based approach," 3GPP TSG RAN WG1 Meeting #86, R1-166088, Gothenburg, Sweden, Aug. 22-26, 2016, 8 pages.
ZTE Corporation, ZTE Microelectronics, "Views on transmission schemes for NR MIMO," 3GPP TSG RAN WG1 Meeting #86, R1-166216, Gothenburg, Sweden Aug. 22-26, 2016, 8 pages.

* cited by examiner

COMMUNICATIONS METHOD AND APPARATUS

CROSS-REFERENCE TO RELATED APPLICATIONS

This application is a continuation of International Application No. PCT/CN2019/107574, filed on Sep. 24, 2019, which claims priority to Chinese Patent Application No. 201811151606.X, filed on Sep. 29, 2018. The disclosures of the aforementioned applications are hereby incorporated by reference in their entireties.

TECHNICAL FIELD

This application relates to the field of communications technologies, and in particular, to a communications method and apparatus.

BACKGROUND

A core idea of multiple-input multiple-output (MIMO) is to use a plurality of transmit antennas and a plurality of receive antennas at a transmit end and a receive end respectively to combine (beamforming) signals in a spatial domain to form a plurality of parallel spatial data channels (thereby increasing a data transmission rate). Alternatively, a diversity may be added to improve communication quality (a decrease in a bit error rate (BER) and an increase in reliability). In this way, the signals are transmitted and received via a plurality of antennas at the transmit end and the receive end, thereby improving the communication quality.

To support MIMO, a base station is designed into a structure that includes a multiple-transmit multiple-receive remote radio unit (RRU) and a multiple-transmit multiple-receive antenna system. For example, the base station includes an RRU of 8T8R and an antenna system of 8T8R. Transmit channels of the RRU are connected to eight input channels of the antenna system in a one-to-one correspondence. Transmit signals of the eight input channels are spatially combined, and this improves coverage and a capacity gain of the base station.

To ensure performance of the foregoing base station, channel consistency from the RRU to the antenna system needs to be ensured. In a power division network, one RRU of 8T8R can be connected to a plurality of antenna systems of 8T8R. For example, the one RRU of 8T8R is connected to three antenna systems of 8T8R. The RRU of 8T8R is connected to one 1-to-3 power splitter, where the power splitter has three output signals, and then the RRU of 8T8R is connected to ports of each antenna system.

The RRU has only one calibration port and cannot be connected to three antenna systems. Therefore, the RRU can connect only the calibration port to a calibration port of the power splitter to ensure radio frequency channel consistency between the RRU and the power splitter, but cannot ensure radio frequency channel consistency between the power splitter and the antenna. As a result, beamforming performance is affected, and a coverage capability of the base station is greatly reduced.

SUMMARY

Embodiments of this application provide a communications method and apparatus, to improve channel transmission performance when radio frequency channel consistency cannot be ensured in a power division network.

According to a first aspect, an embodiment of this application provides a communication method. The method includes: A base station generates a first signal, performs cyclic delay diversity (CDD) weighted processing on the first signal to obtain a second signal, and performs densified beam weighted processing on the second signal to obtain a third signal, and finally the base station sends the third signal via an antenna.

According to the foregoing method, the CDD weighted processing is performed on the first signal generated by the base station to obtain the second signal, so that time diversity can be obtained when the first signal is transmitted, thereby improving a coverage capability of the base station. In addition, the densified beam weighted processing is performed on the second signal obtained after the CDD weighted processing to obtain the third signal, so that a quantity of beams scanned by the base station can be increased. In this way, coverage of the base station is smoother, and a coverage hole does not occur, thereby further improving the coverage capability of the base station. In this way, the coverage of the base station can be added and channel transmission performance can be improved when radio frequency channel consistency cannot be ensured in a power division network.

In this embodiment of this application, how to perform CDD weighted processing on the first signal is not limited.

In a possible design, the second signal and the first signal satisfy:

$$s_{CDD}(k) = \begin{bmatrix} 1 \\ e^{j\theta(k)} \end{bmatrix} * s(k),$$

where $S_{CDD}(k)$ is the second signal, s(k) is the first signal, $$\begin{bmatrix} 1 \\ e^{j\theta(k)} \end{bmatrix}$$

is a CDD weight matrix, $$\theta(k) = 2\pi D \frac{k}{N_{FFT}}, k = 0, 1, \ldots, N_{FFT} - 1,$$

D is a delay length, and $N_{FFT}$ is an FFT length.

In a possible design, a value of D is one or two time domain sampling points.

In this embodiment of this application, how to perform the densified beam weighted processing on the second signal obtained after the CDD weighted processing is not limited.

In a possible design, the third signal and the second signal satisfy:

$$s_{Out}(k) \begin{bmatrix} W(m) & 0 \\ 0 & W(m) \end{bmatrix} * s_{CDD}(k),$$

where $s_{Out}(k)$ is the third signal, $$\begin{bmatrix} W(m) & 0 \\ 0 & W(m) \end{bmatrix}$$

is a beam weight matrix, $$W(m) = \begin{bmatrix} 1 & e^{j\frac{2\pi m}{Q*N}} & e^{j\frac{4\pi m}{Q*N}} & \ldots & e^{j\frac{2\pi m(N-1)}{Q*N}} \end{bmatrix},$$

m represents a beam number, m=1, 2, . . . , Q*N, N represents a total quantity of transmit antennas, and Q is a beam densification multiple.

In a possible design, a value of Q is 2.

According to a second aspect, an embodiment of this application provides a communications apparatus. The apparatus includes a unit or a means (means) configured to perform the steps in the first aspect.

According to a third aspect, an embodiment of this application provides a communications apparatus. The communications apparatus may be a base station, and includes at least one processor and a memory. The memory stores a computer program, and the at least one processor is configured to invoke the computer program to perform the method provided in the first aspect.

According to a fourth aspect, an embodiment of this application provides a chip. The chip may be a chip in a base station, where the chip is connected to a memory or the chip includes a memory, and is configured to read and execute a software program stored in the memory, to implement the method according to any one of the first aspect or the possible designs of the first aspect.

According to a fifth aspect, this application provides a computer-readable storage medium. The computer-readable storage medium stores some instructions. When these instructions are invoked and executed by a computer, the computer is enabled to perform the method according to any one of the first aspect or the possible designs of the first aspect.

According to a sixth aspect, this application provides a computer program product. When being invoked and executed by a computer, the computer program product can perform the method according to any one of the first aspect or the possible designs of the first aspect.

DESCRIPTION OF EMBODIMENTS

Figure 1:
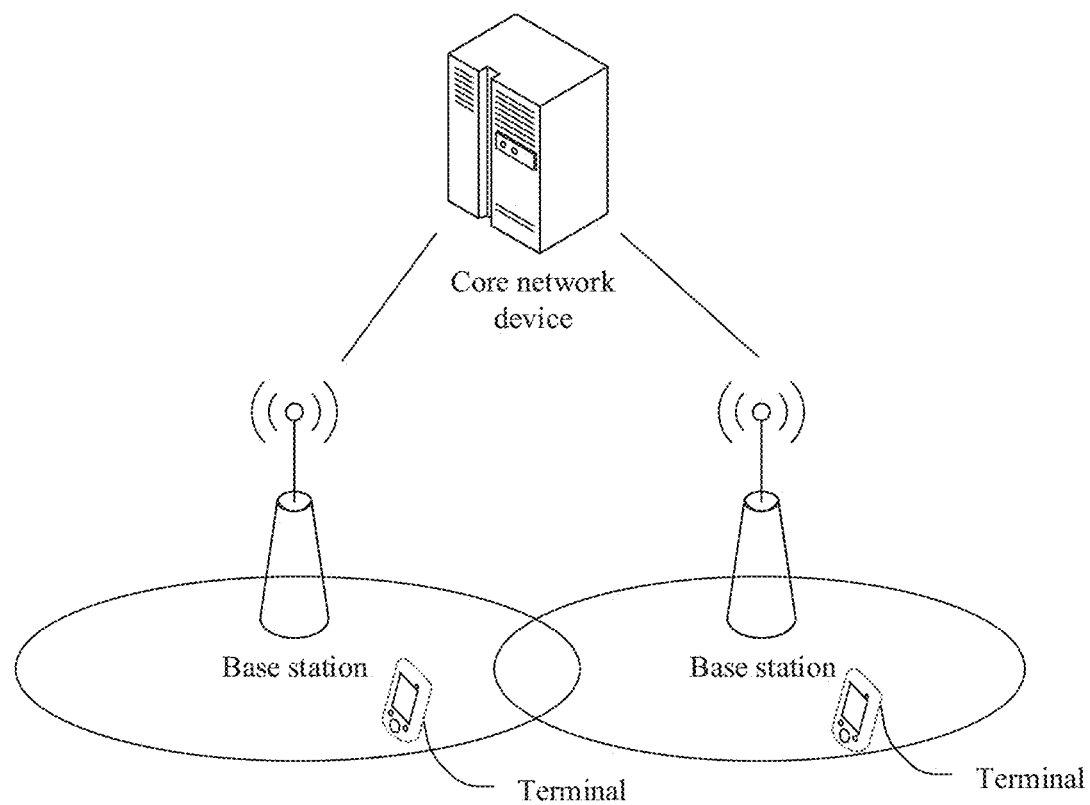
FIG. 1 is a schematic diagram of a network architecture to which an embodiment of this application may be used.

The following describes this application in detail with reference to the accompanying drawings in the specification.

Some terms in this application are first described, to help a person skilled in the art have a better understanding.

(1) A terminal may be a device that provides voice and/or data connectivity for a user, and is also referred to as user equipment (UE), a mobile station (MS), a mobile terminal (MT), or the like. For example, a handheld device or a vehicle-mounted device that has a wireless connection function. Currently, some examples of the terminal are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

As an example instead of a limitation, in the embodiments of this application, the terminal may alternatively be the wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of the user. The wearable device is not only a hardware device, but is used to implement a powerful function through software support, a data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

(2) A base station may be a radio access network (RAN) node (or device) that connects a terminal device to a wireless network. Currently, examples of some RAN nodes are: a continuously evolved NodeB (gNB), a transmission reception point (TRP), an evolved NodeB (eNB), a radio network controller (RNC), a NodeB (NB), a base station controller (BSC), a base transceiver station (BTS), a home evolved NodeB (for example, a home evolved NodeB or a home NodeB, HNB), a baseband unit (BBU), a wireless fidelity (Wi-Fi) access point (AP), or the like. In addition, in a network structure, the RAN may include a centralized unit (CU) node and a distributed unit (DU) node. In this structure, protocol layers of an eNB in a long term evolution (LTE) system are split, where functions of some protocol layers are centrally controlled by the CU, functions of some or all of remaining protocol layers are distributed in the DU, and the CU centrally controls the DU.

(3) A core idea of multiple-input multiple-output MIMO (MIMO) is to use a plurality of transmit antennas and a plurality of receive antennas at a signal transmit end and a signal receive end respectively to combine (for example, beamforming) signals in a spatial domain to form a plurality of parallel spatial data channels (thereby increasing a data transmission rate). Alternatively, a diversity may be added to improve communication quality (a decrease in a bit error rate BER and an increase in reliability). In this way, the signals are transmitted and received via a plurality of antennas at the transmit end and the receive end, thereby improving the communication quality. For a wireless device supporting MIMO, a key is to ensure transmit channel consistency. A reason is that a transmit channel of a radio frequency is also a channel with a channel response feature, and beamforming is actually weighting each transmit channel to form a beam. If responses of the transmit channels are inconsistent, after radio frequency transmission, the actual weighting factor changes. As a result, the beamforming performance deteriorates, and even the beamforming function becomes unavailable.

(4) The beamforming is a signal preprocessing technology based on an antenna array. In the beamforming, a directional beam is generated by adjusting a weighting coefficient of each array element in the antenna array, so that evident array gains can be obtained.

(5) A core network device may be a mobile management entity (MME) in LTE, or may be a gateway, or may be a control plane (CP) network function (NF) or a user plane (UP) network function in a 5th generation (5G) mobile communications system network, for example, a common control plane network function (CCNF), a session management network function (SMF), and an access and mobility management function entity (AMF).

(6) A radio frequency channel may be a channel for transmitting a radio frequency signal to an antenna. The radio frequency channel may include a radio frequency channel in the RRU, a radio frequency channel in the antenna, and/or a radio frequency channel between the RRU and the antenna. The radio frequency channel in the RRU may be configured to complete conversion between a baseband signal and the radio frequency signal. A plurality of radio frequency channels in the RRU may share a circuit channel, or each radio frequency channel may include an independent circuit channel. The circuit channel in the RRU may include one or more electronic devices. The radio frequency channel between the RRU and the antenna may be a cable channel between the RRU and the antenna. The radio frequency channel may be a concept physically or of an entity. This is not limited in the embodiments of this application.

(7) Channel consistency means that channel responses between channels maintain consistency between phases and/or amplitudes within a specific threshold range. It may be understood that the radio frequency channel consistency means that channel responses of the radio frequency channels maintain consistency between phases and/or amplitudes within a specific threshold range. For example, channel responses of two radio frequency channels maintain consistency of phases and/or amplitudes within a specific threshold range.

(8) In the descriptions of this application, unless otherwise specified, "a plurality of" means two or more, and another quantifier is similar to this. The term "and/or" describes an association relationship between associated objects and represents that three relationships may exist. For example, A and/or B may represent the following three cases: Only A exists, both A and B exist, and only B exists. The character "/" generally represents an "or" relationship between the associated objects.

(9) The nouns "network" and "system" are often interchangeably used, but meanings of the nouns can be understood by a person skilled in the art.

It should be noted that, in descriptions of this application, words such as "first" and "second" are merely used for distinction and description, and shall not be understood as an indication or implication of relative importance or an indication or implication of an order.

FIG. 1 is a schematic diagram of a network architecture to which an embodiment of this application may be used. As shown in FIG. 1, a terminal may access a wireless network through a base station, to obtain a service of an external network (for example, the internet) by using the wireless network, or to communicate with another terminal by using the wireless network. The wireless network includes the base station and a core network device, where the core network device is configured to manage the terminal and provide a gateway for communicating with the external network. It should be understood that the network architecture shown in FIG. 1 is described by using only an example in which two base stations are included. However, this embodiment of this application is not limited thereto. For example, the network architecture may further include more base stations. Similarly, the network architecture may also include more terminals, and may further include another network device.

In this embodiment of this application, the base station shown in FIG. 1 may include a baseband unit (BBU), an RRU, and an antenna system. A structure of the base station in FIG. 1 may support MIMO, and includes a multiple-transmit (transmit, T) multiple-receive (receive, R) RRU and a multiple-transmit multiple-receive antenna system, where a base station of this structure may support MIMO.

It should be noted that an RRU included in the base station may be directly connected to the antenna system via a cable, or may be connected to the antenna system via a power splitter. The following provides descriptions separately.

Figure 2:
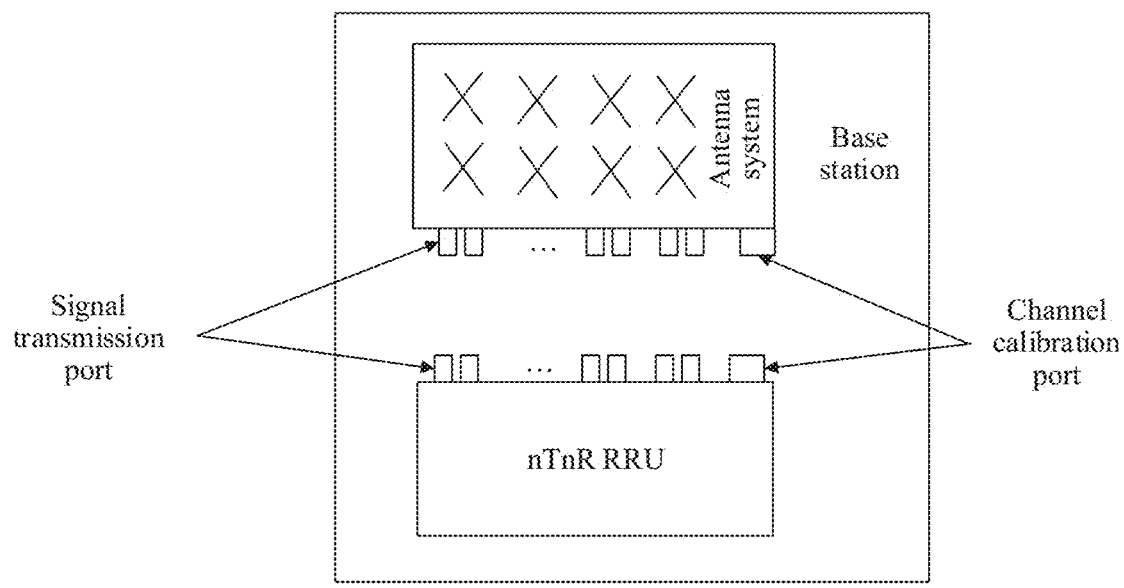
FIG. 2 is a schematic structural diagram of a base station according to an embodiment of this application.

FIG. 2 is a schematic structural diagram of a base station including an RRU of nTnR and an antenna system of nTnR. In FIG. 2, an example in which an RRU included in the base station may be directly connected to the antenna system via a cable is used for description. It can be learned from FIG. 2 that the RRU of nTnR includes n signal transmission ports and one channel calibration port, and the antenna system of nTnR also includes n signal transmission ports and one channel calibration port, where n is a positive integer greater than 2. During signal transmission, the n signal transmission ports included in the RRU of nTnR are connected, in a one-to-one correspondence, to the n signal transmission ports included in the antenna system of nTnR, to perform signal transmission. For ease of description, the RRU may refer to the RRU of nTnR, and the antenna system may refer to the antenna system of nTnR. To ensure radio frequency channel consistency between the RRU and the antenna system, a channel calibration port of the RRU and a channel calibration port of the antenna system may be connected, and reference signals (amplitude and phase measurement) of n radio frequency channels are transmitted to the RRU through the channel calibration port of the antenna system.

Further, the radio frequency channel between the RRU and the antenna system is calibrated based on the reference signals, thereby ensuring the radio frequency channel consistency between the RRU and the antenna system.

It should be noted that the RRU of the nTnR and the antenna system of the nTnR that are included in the base station may be integrated into one device. For example, the base station may be an active antenna unit (AAU), or may be an independent structure, for example, the RRU may be a radio frequency unit (RFU), and the antenna system may include a plurality of antennas, where the plurality of antennas may be arranged in one radome. This is not limited in this application.

Figure 3:
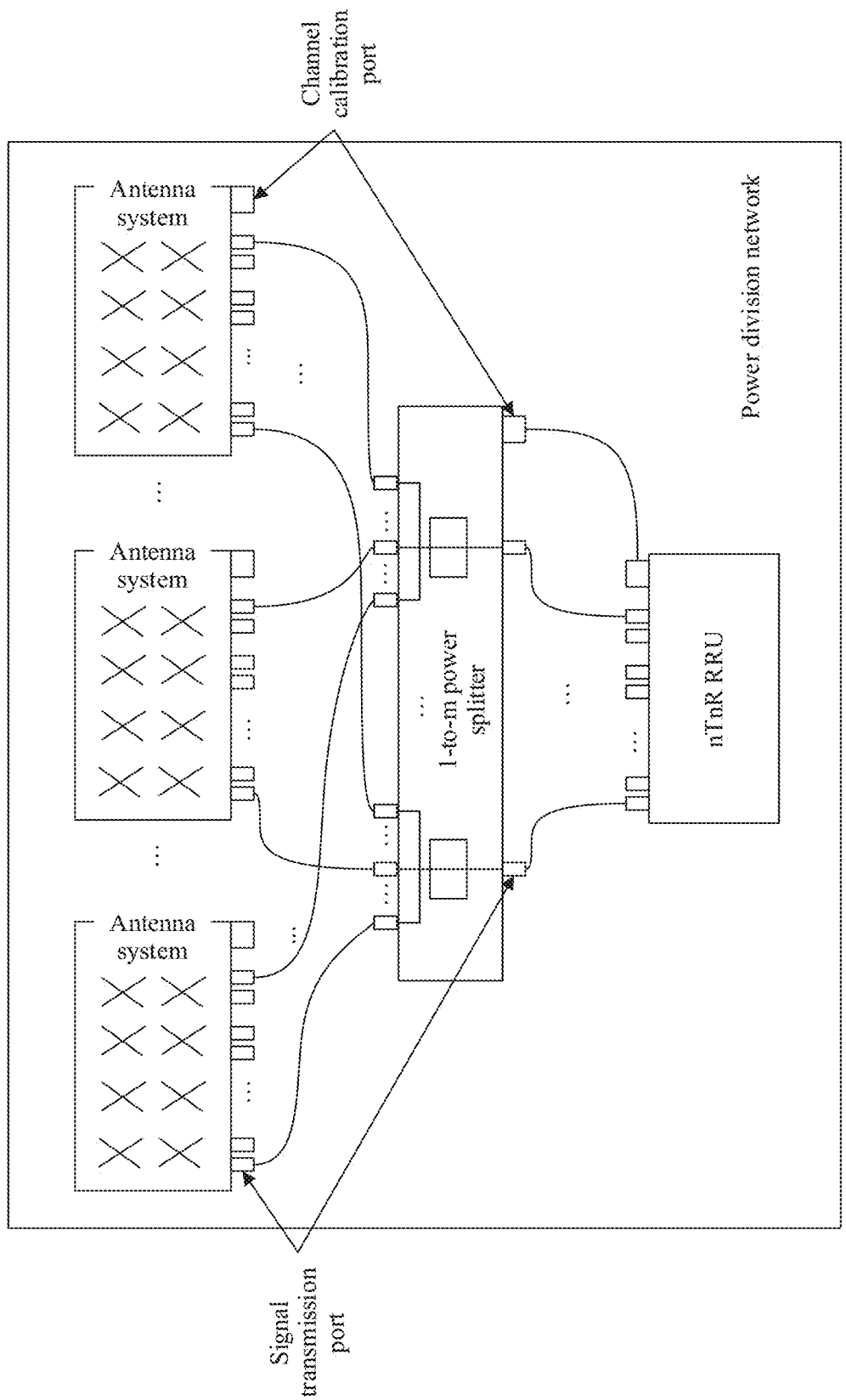
FIG. 3 is a schematic architectural diagram of a power division network according to an embodiment of this application.
Figure 4:
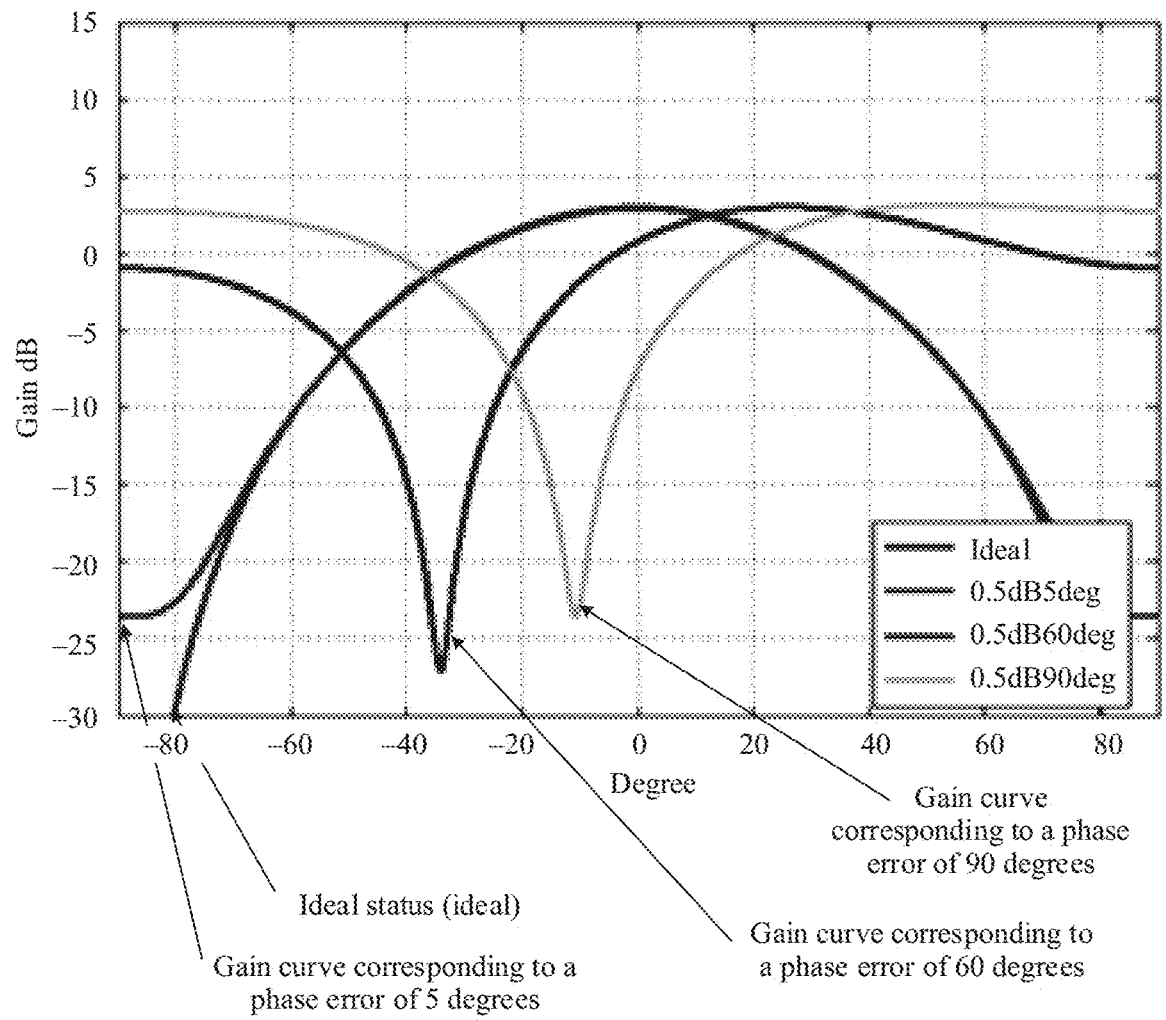
FIG. 4 is a schematic diagram of a curve of a relationship between a phase error and a gain according to an embodiment of this application.

FIG. 3 is a schematic diagram of a possible power division network structure. In FIG. 3, an example in which an RRU included in the base station may be directly connected to the antenna system via a power splitter is used for description. As is shown in FIG. 3, in a power division network, one RRU of nTnR can be connected to a plurality of antenna systems of the nTnR. For example, the one RRU of the nTnR is connected to m antenna systems of 8T8R. In the power division network, the RRU of nTnR is connected to one 1-to-m power splitter, m output signals of the power splitter, and the RRU of nTnR is connected to the ports of each antenna system, where n and m are positive integers greater than 2. The RRU has only one channel calibration port and cannot be connected to m antenna systems. Therefore, the RRU can only connect the one channel calibration port to a channel calibration port of the power splitter to ensure radio frequency channel consistency between the RRU and the power splitter, but cannot ensure radio frequency channel consistency between the power splitter and the antenna system. In addition, there are a plurality of radio frequency cables between the power splitter and the antenna system. A length difference of each radio frequency cable leads to a phase difference between channels. For example, in the 3.5 GHz frequency band, a length difference of each 1 mm radio frequency cable causes a phase error of about 4.2 degrees. At the same time, the power splitter causes a phase error. Even a well-designed power splitter brings a phase error of ±10 degrees to each channel, and the phase error of each channel affects the channel consistency. FIG. 4 is a schematic diagram of a curve of a relationship between a phase error and a gain obtained by means of simulation. It can be learned from FIG. 4 that a gain curve corresponding to a phase error of 5 degrees basically coincides with a gain curve corresponding to an ideal state except for an initial position, it can be understood that performance deterioration caused by a 5-degree phase error is acceptable. Once the phase error exceeds this range, a channel transmission performance loss is relatively large. Therefore, in a power division network, when radio frequency channel consistency between a power splitter and an antenna system cannot be ensured, and how to improve the channel transmission performance is a problem worth studying.

Based on the foregoing existing problem, an embodiment of this application provides a communication method. Before a base station sends a signal, CDD weighted processing is performed on a signal generated by the base station, so that a time diversity can be obtained when the signal is transmitted, thereby improving a coverage capability of the base station. In addition, densified beam weighted processing is performed on a signal obtained after the CDD weighted processing, so that a quantity of beams scanned by the base station can be increased. In this way, coverage of the base station is smoother, and a coverage hole does not occur, thereby further improving the coverage capability of the base station. In this way, coverage of the base station can be increased and channel transmission performance can be improved when radio frequency channel consistency cannot be ensured in a power division network.

Figure 5:
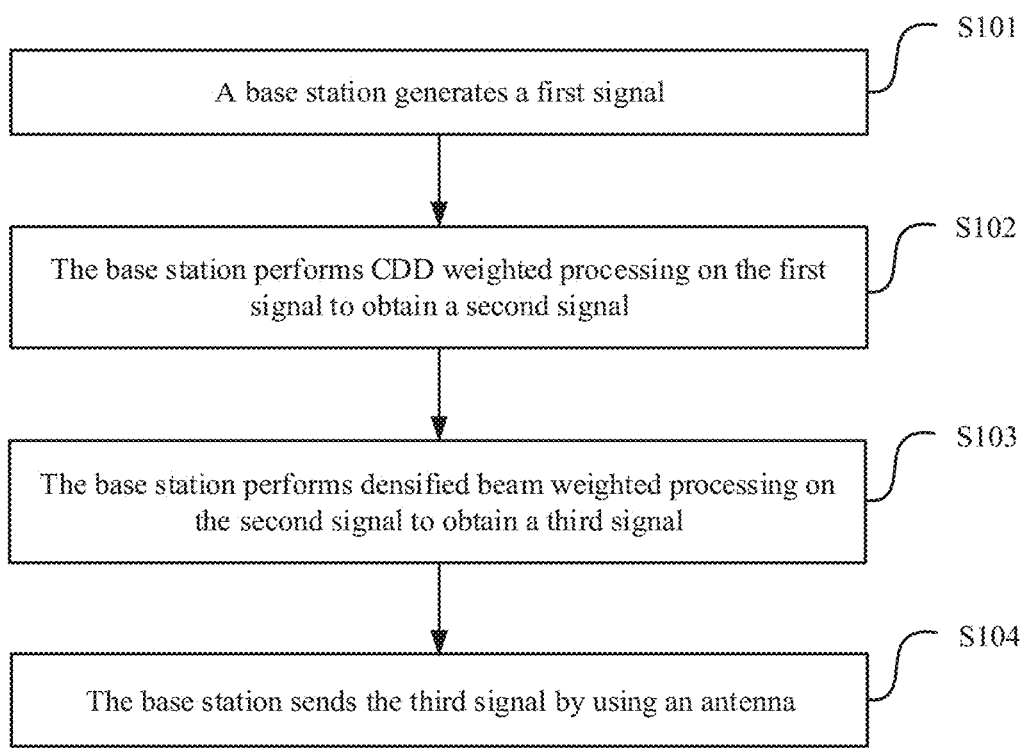
FIG. 5 is a schematic flowchart of a communication method according to an embodiment of this application.

FIG. 5 is an implementation flowchart of a communication method according to an embodiment of this application. As shown in FIG. 5, the method includes the following steps.

S101. A base station generates a first signal.

In this embodiment of this application, the first signal may be a baseband signal.

S102. The base station performs CDD weighted processing on the first signal to obtain a second signal.

In this embodiment of this application, the second signal may be the baseband signal.

Figure 6:
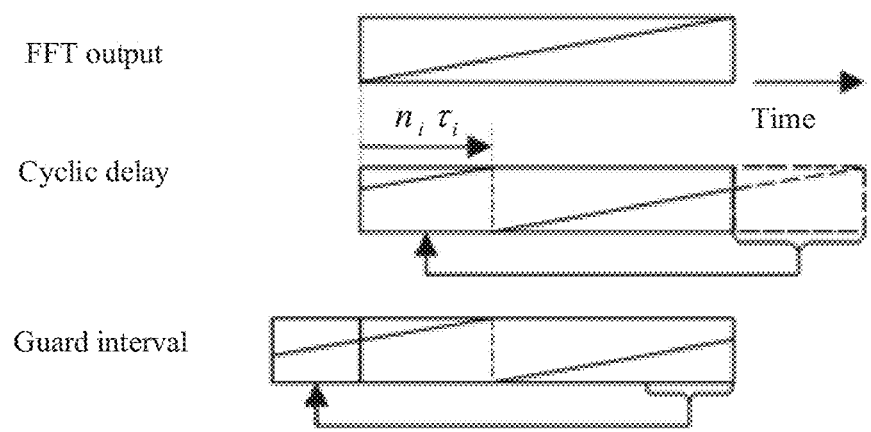
FIG. 6 is a schematic diagram of a CDD weighted processing principle of a time domain signal according to an embodiment of this application.

When the base station performs the CDD weighted processing on the first signal, a delay is caused between antennas in the antenna system. FIG. 6 is a schematic diagram of a CDD weighted processing principle for a time domain signal. After the base station performs fast Fourier transform (FFT) on a first signal, the base station performs cyclic shift on a signal that is output on an antenna, and moves ni sampling points after an orthogonal frequency division multiplexing (OFDM) symbol to be before the symbol.

It is assumed that a time domain signal obtained after inverse Fourier transform (IFFT) without CDD processing is:

$$s(l) = \frac{1}{\sqrt{N_{FFT}}} \sum_{k=0}^{N_{FFT}-1} s(k) e^{j\frac{2\pi}{N_{FFT}}kl}$$

In this case, a time domain symbol obtained after CDD processing on the $n^{th}$ transmit antenna is:

$$s((l-\delta_{cyc,n}) \bmod N_{FFT}) = \frac{1}{\sqrt{N_{FFT}}} \sum_{k=0}^{N_{FFT}-1} s(k) e^{j\frac{2\pi}{N_{FFT}}k(l-\delta_{cyc,n})}$$

$$= \frac{1}{\sqrt{N_{FFT}}} \sum_{k=0}^{N_{FFT}-1} e^{-j\frac{2\pi}{N_{FFT}}k\delta_{cyc,n}} s(k) e^{j\frac{2\pi}{N_{FFT}}kl}$$

It may be understood as being equivalent to multiplying, in frequency domain, a transmitted signal on a subcarrier numbered k by $$e^{-j\frac{2\pi}{N_{FFT}}k\delta_{cyc,n}}.$$

Phases multiplied on each subcarrier in frequency domain are different, and a phase value corresponding to the subcarrier numbered k is:

$$\theta(k) = 2\pi D \frac{k}{N_{FFT}}, k = 0, 1, \ldots, N_{FFT} - 1,$$

where D is an added delay length, and $N_{FFT}$ is an FFT length.

For example, for an 8T base station, a CDD weight matrix mapped onto two ports is as follows:

$$W_{CDD}(k) = \begin{bmatrix} 1 & 0 \\ e^{-j(\theta(k))} & 0 \\ e^{-j(2\theta(k))} & 0 \\ e^{-j(3\theta(k))} & 0 \\ 0 & 1 \\ 0 & e^{-j(\theta(k))} \\ 0 & e^{-j(2\theta(k))} \\ 0 & e^{-j(3\theta(k))} \end{bmatrix}$$

For example, for an 8T base station, a CDD weight matrix mapped onto four ports is as follows:

$$W_{CDD}(k) = \begin{bmatrix} 1 & 0 & 0 & 0 \\ e^{-j(\theta(k))} & 0 & 0 & 0 \\ 0 & 1 & 0 & 0 \\ 0 & e^{-j(\theta(k))} & 0 & 0 \\ 0 & 0 & 1 & 0 \\ 0 & 0 & e^{-j(\theta(k))} & 0 \\ 0 & 0 & 0 & 1 \\ 0 & 0 & 0 & e^{-j(\theta(k))} \end{bmatrix}$$

In this embodiment of this application, how to perform CDD weighted processing on the first signal is not limited.

In a possible design, a second signal and the first signal satisfy:

$$s_{CDD}(k) = \begin{bmatrix} 1 \\ e^{j(\theta(k))} \end{bmatrix} * s(k),$$

where $s_{CDD}(k)$ is the second signal, $s(k)$ is the first signal, $$\begin{bmatrix} 1 \\ e^{j(\theta(k))} \end{bmatrix}$$

is a CDD weight matrix, $$\theta(k) = 2\pi D \frac{k}{N_{FFT}}, k = 0, 1, \ldots, N_{FFT} - 1,$$

D is a delay length, and $N_{FFT}$ is the FFT length. It may be understood that in this possible design, the base station multiplies the first signal by the CDD weight matrix $$\begin{bmatrix} 1 \\ e^{j(\theta(k))} \end{bmatrix},$$

to obtain the second signal $$s_{CDD}(k) = \begin{bmatrix} 1 \\ e^{j(\theta(k))} \end{bmatrix} * s(k)$$

obtained after the CDD weighted processing.

In this embodiment of this application. D may be determined based on a required time of a delay in actual application. D is not limited in this application. In a possible design, a value of D is one or two time domain sampling points.

S103. The base station performs densified beam weighted processing on the second signal obtained after the CDD weighted processing to obtain a third signal.

In this embodiment of this application, the third signal may be a baseband signal.

In this embodiment of this application, how to perform the densified beam weighted processing on the second signal obtained after the CDD weighted processing is not limited.

In a possible design, the third signal and the second signal satisfy.

$$s_{Out}(k) = \begin{bmatrix} W(m) & 0 \\ 0 & W(m) \end{bmatrix} * s_{CDD}(k),$$

where $s_{Out}(k)$ is the third signal, $$\begin{bmatrix} W(m) & 0 \\ 0 & W(m) \end{bmatrix}$$

is a beam weight matrix, $$W(m) = \begin{bmatrix} 1 & e^{j\frac{2\pi m}{Q*N}} & e^{j\frac{4\pi m}{Q*N}} & \ldots & e^{j\frac{2\pi m(N-1)}{Q*N}} \end{bmatrix},$$

m represents a beam number, m=1, 2, ..., Q*N, N represents a total quantity of transmit antennas, and Q is a beam densification multiple. It may be understood that in this possible design, the base station multiplies the second signal $s_{CDD}(k)$ obtained after the CDD weighted processing by the beam weight matrix $$\begin{bmatrix} W(m) & 0 \\ 0 & W(m) \end{bmatrix},$$

to obtain a third signal $$s_{Out}(k) = \begin{bmatrix} W(m) & 0 \\ 0 & W(m) \end{bmatrix} * s_{CDD}(k)$$

obtained after the densified beam weighted processing.

In this embodiment of this application, the beam densification multiple is a densification multiple of a beam sent by the base station. For example, if the base station sends four beams, after twofold densification is performed on the four beams sent by the base station densified, a quantity of beams sent by the base station is increased to 8. For example, if the base station sends four beams, after threefold densification is performed on the four beams sent by the base station densified, a quantity of beams sent by the base station is increased to 12.

In this embodiment of this application, the beam densification multiple is not limited. For example, twofold, threefold, or even more-fold densification may be performed densified. In a possible design, twofold densification is performed on a beam sent by the base station densified, that is, a value of Q is 2.

It should be noted that, in this embodiment of this application, S101 to S103 may be performed by a BBU or a chip in the BBU.

S104. The base station sends, via the antenna, the third signal obtained after the densified beam weighted processing.

It should be noted that the third signal obtained after the densified beam weighted processing may be the baseband signal. Before sending the baseband signal via the antenna, the base station may further perform radio frequency processing on the baseband signal. For example, an RRU performs radio frequency processing on the baseband signal, that is, a signal sent by the base station via the antenna may be a radio frequency signal.

According to the foregoing method provided in this embodiment of this application, the base station performs CDD weighted processing on a generated baseband signal, so that time diversity can be obtained when the baseband signal is transmitted, thereby improving a coverage capability of the base station. In addition, the densified beam weighted processing is performed on a baseband signal obtained after the CDD weighted processing, so that a quantity of beams scanned by the base station can be increased. In this way, coverage of the base station is smoother, and a coverage hole does not occur, thereby further improving the coverage capability of the base station. In this way, coverage of the base station can be added and channel transmission performance can be improved when radio frequency channel consistency cannot be ensured in a power division network.

Figure 7:
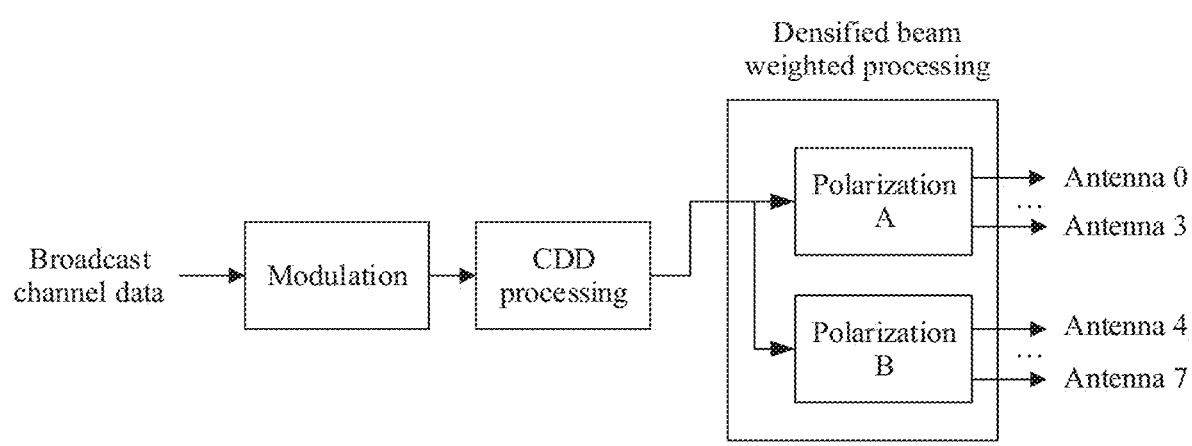
FIG. 7 is a schematic flowchart of another communication method according to an embodiment of this application.

The following describes in detail the communication method provided in this application by using a specific example in the embodiments of this application. Referring to FIG. 7, in this example, it is assumed that the base station uses dual-polarized (polarization A and polarization B in the figure) antennas, and single polarization corresponds to four antennas. It can be learned from FIG. 7 that the four transmit antennas corresponding to polarization A are respectively an antenna 0, an antenna 1, an antenna 2, and an antenna 3, and four transmit antennas corresponding to the polarization B are an antenna 4, an antenna 5, an antenna 6, and an antenna 7. The base station sends four beams on a broadcast channel, and different beams are sent at different time domain locations. According to the method provided in this application, the four beams sent by the base station on the broadcast channel may be densified into eight beams. In this way, impact of consistency on a beam envelope can be reduced, and overall smoothness of the beam envelope can be ensured.

It is assumed that a single-polarized four-beam design before densification is as follows:

$$W(m) = \begin{bmatrix} 1 & e^{j\frac{2\pi m}{N}} & e^{j\frac{4\pi m}{N}} & \ldots & e^{j\frac{2\pi m(N-1)}{N}} \end{bmatrix}$$

where, m=1, 2, 3, and N=4, indicating a quantity of single-polarized antennas at a transmit end.

In this case, a single-polarized eight-beam design after densification may as follows:

$$W(m) = \begin{bmatrix} 1 & e^{j\frac{2\pi m}{2*N}} & e^{j\frac{4\pi m}{2*N}} & \ldots & e^{j\frac{2\pi m(N-1)}{2*N}} \end{bmatrix}$$

where, m=1, ..., 7, and N=4, indicating a quantity of single-polarized antennas at the transmit end.

After the beam is densified by using the method provided in this embodiment of this application, CDD processing may be further performed on a to-be-sent signal, and then the signal obtained after the CDD processing may be sent.

Figure 8A:
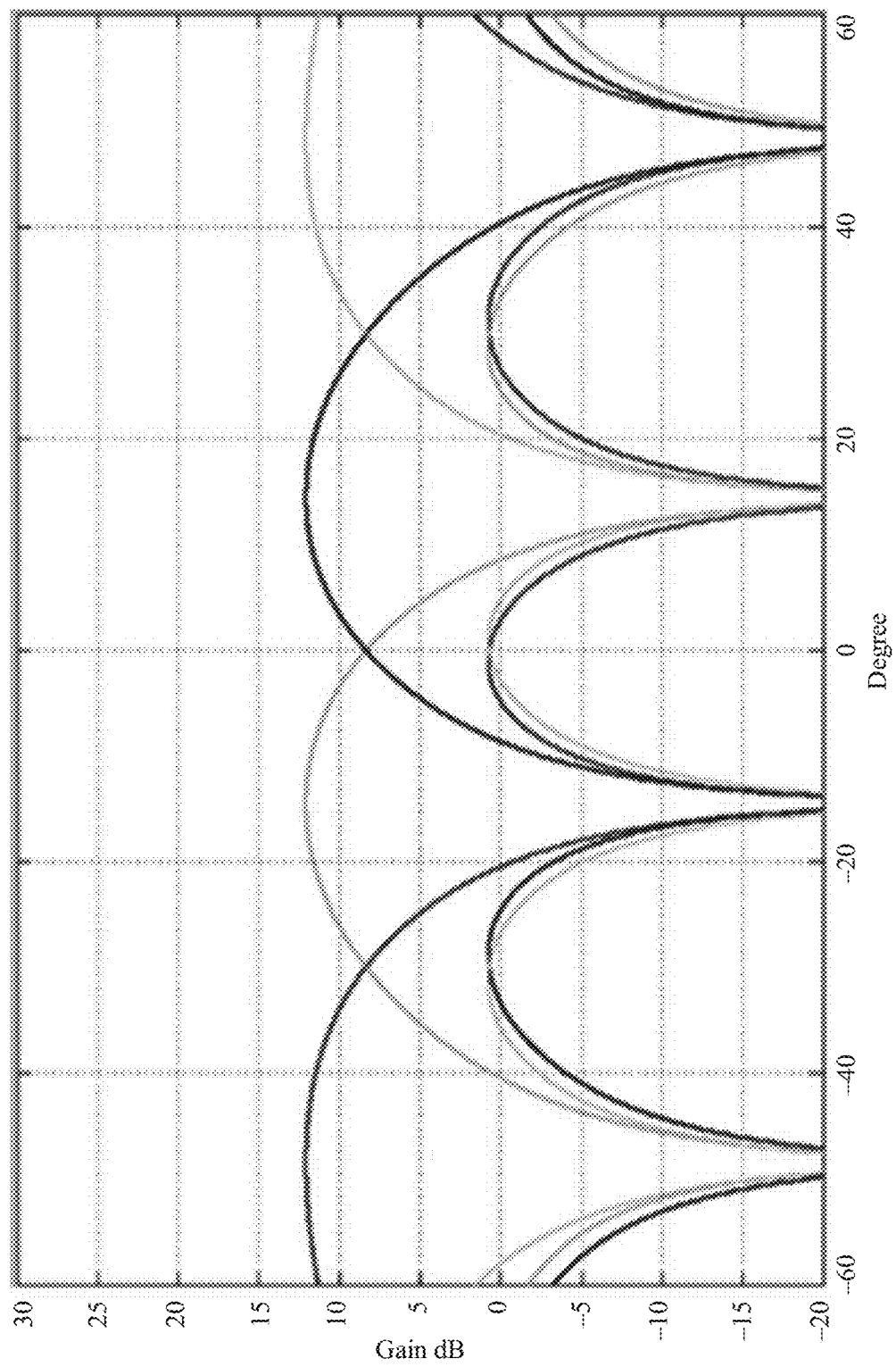
FIG. 8a and FIG. 8b are schematic diagrams of a curve of a relationship between a phase error and a gain according to an embodiment of this application.
Figure 8B:
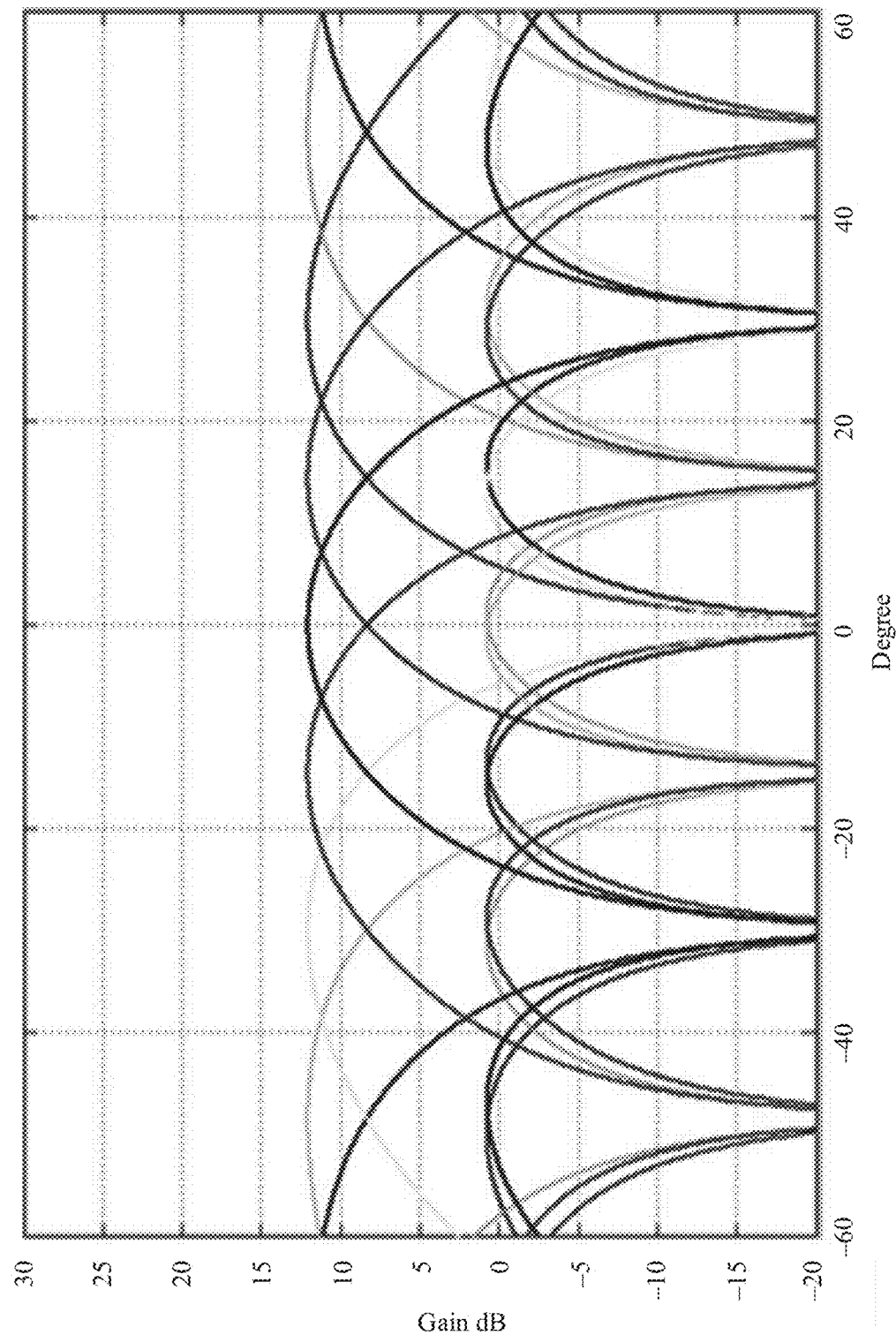

FIG. 8a is a schematic diagram of a curve of a relationship between a phase error (unit: degree) and a gain (gain unit (dB)) obtained through simulation when the method provided in this embodiment of this application is not used in the example provided in FIG. 7. It can be learned from FIG. 8a that when the method provided in this embodiment of this application is not used, there are four beams sent by the base station, and different peaks represent different beams. It can be learned from FIG. 8a that a channel coverage capability is relatively poor when a transmit beam of the base station is 4. FIG. 8b is a schematic diagram of a curve of a relationship between a phase error (unit: degree) and a gain (gain unit (dB)) obtained through simulation when the method provided in this embodiment of this application is not used in the example provided in FIG. 7. It can be learned from FIG. 8b that when the method provided in this embodiment of this application is used, there are eight beams sent by the base station. In other words, the beams sent by the base station are densified by using the method provided in this application, so that the quantity of beams sent by the base station is changed from 4 to 8. The quantity of beams scanned by the base station can ensure that a signal coverage capability of the base station is improved when radio frequency channel consistency cannot be ensured, so that an overall coverage envelope is smooth, no coverage hole occurs, and the coverage is improved. In addition, the CDD processing can generate a diversity effect, which further improves the signal coverage capability of the base station.

Figure 9:
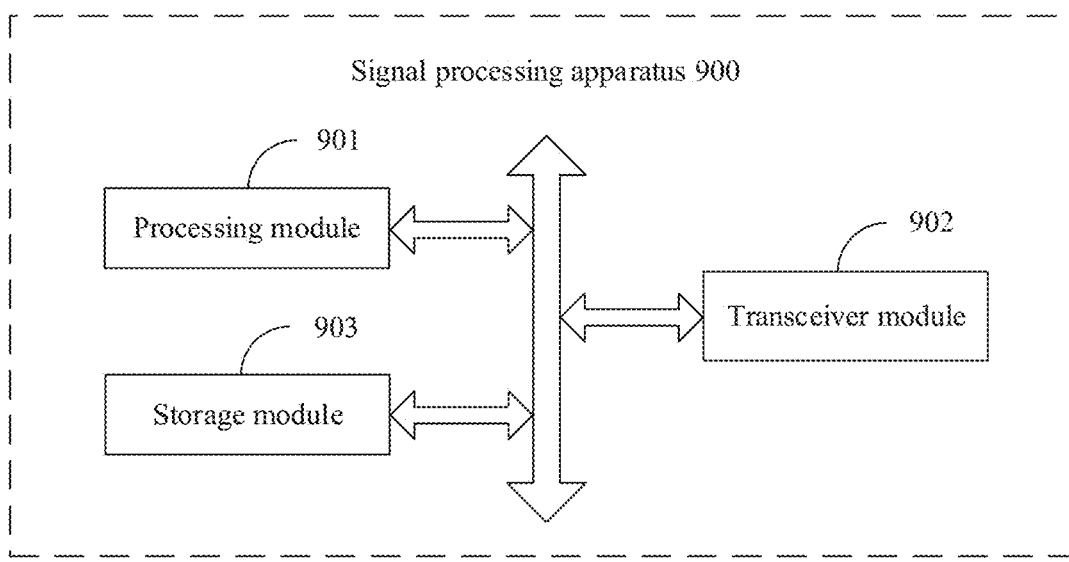
FIG. 9 is a schematic structural diagram of a communications apparatus according to an embodiment of this application.

Based on a same inventive concept, an embodiment of this application further provides a communications apparatus. The apparatus may have a structure shown in FIG. 9, and has a behavior function of the base station in the foregoing method embodiment. As shown in FIG. 9, an apparatus 900 may include a processing module 901 and a transceiver module 902. In an implementation, the apparatus 900 may further include a storage module 903. The storage module 903 may be coupled to the processing module 901, and is configured to store a program and an instruction that are required by the processing module 901 to perform a function.

Based on the communication method shown in FIG. 5, the processing module 901 in the apparatus 90 shown in FIG. 9 may be configured by the apparatus 900 to perform the steps shown in S101, S102, or S103, and the transceiver module 902 may be configured by the apparatus 900 to perform the step shown in S104.

In a possible design, the second signal and the first signal satisfy:

$$s_{CDD}(k) = \begin{bmatrix} 1 \\ e^{j(\theta(k))} \end{bmatrix} * s(k),$$

where $s_{CDD}(k)$ is the second signal, $s(k)$ is the first signal, $$\begin{bmatrix} 1 \\ e^{j(\theta(k))} \end{bmatrix}$$

is a CDD weight matrix, $$\theta(k) = 2\pi D \frac{k}{N_{FFT}}, k = 0, 1, \ldots, N_{FFT} - 1,$$

D is a delay length, and $N_{FFT}$ is an FFT length. In this possible design, the processing module 901 may perform cyclic delay diversity CDD weighted processing on the baseband signal s(k) in the following manner:

Multiplying the baseband signal s(k) by the CDD weight matrix $$\begin{bmatrix} 1 \\ e^{j(\theta(k))} \end{bmatrix},$$

to obtain a baseband signal $$s_{CDD}(k) = \begin{bmatrix} 1 \\ e^{j(\theta(k))} \end{bmatrix} * s(k)$$

obtained after the CDD weighted processing.

In a possible design, a value of D is one or two time domain sampling points.

In a possible design, the third signal and the second signal satisfy:

$$s_{Out}(k) = \begin{bmatrix} W(m) & 0 \\ 0 & W(m) \end{bmatrix} * s_{CDD}(k),$$

where $s_{Out}(k)$ is the third signal, $$\begin{bmatrix} W(m) & 0 \\ 0 & W(m) \end{bmatrix}$$

is a beam weight matrix, $$W(m) = \begin{bmatrix} 1 & e^{j\frac{2\pi m}{Q*N}} & e^{j\frac{4\pi m}{Q*N}} & \ldots & e^{j\frac{2\pi m(N-1)}{Q*N}} \end{bmatrix},$$

m represents a beam number, m=1, 2, . . . , Q*N, N represents a total quantity of transmit antennas, and Q is a beam densification multiple. In this possible design, the processing module 901 may perform densified beam weighted processing on the baseband signal obtained after the CDD weighted processing in the following manner:

Multiplying the baseband signal $s_{CDD}(k)$ obtained after the CDD weighted processing by the beam weight matrix $$\begin{bmatrix} W(m) & 0 \\ 0 & W(m) \end{bmatrix},$$

to obtain a signal $$s_{Out}(k) = \begin{bmatrix} W(m) & 0 \\ 0 & W(m) \end{bmatrix} * s_{CDD}(k)$$

obtained after the densified beam weighted processing, where $$W(m) = \begin{bmatrix} 1 & e^{j\frac{2\pi m}{Q*N}} & e^{j\frac{4\pi m}{Q*N}} & \ldots & e^{j\frac{2\pi m(N-1)}{Q*N}} \end{bmatrix},$$

m represents a beam number m=1, 2, . . . , Q*N, N represents a total quantity of transmit antennas, and Q is a beam densification multiple.

In a possible design, a value of Q is 2.

Figure 10:
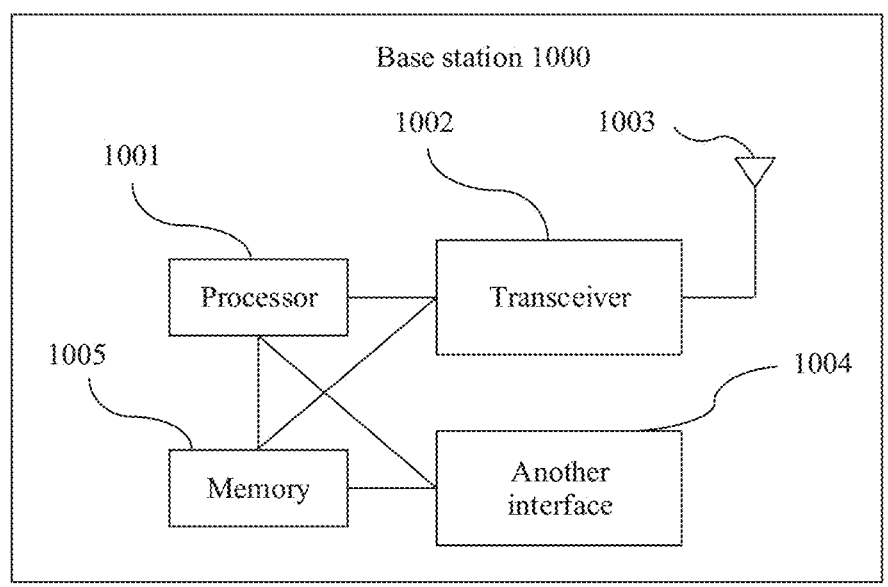
FIG. 10 is a schematic structural diagram of a base station according to an embodiment of this application.

In addition, the communications apparatus in this embodiment of this application may further have a structure of the base station 1000 shown in FIG. 10. The processor 1001 in the base station 1000 shown in FIG. 10 may be configured to implement a function of the processing module 901. For example, the processor 1001 may be used by the base station 1000 to generate a baseband signal s(k), steps such as performing cyclic delay diversity CDD weighted processing on the baseband signal s(k) and performing beam weighted processing on a baseband signal obtained after the CDD weighted processing. The transceiver 1002 may be configured to implement a function of the transceiver module 902. For example, the transceiver 1002 may be configured for the base station 1000 to perform the step shown in S104. In addition, the transceiver 1002 may be coupled to an antenna 1003, and is configured to support the base station 1000 in communication. For example, the base station 1000 may further include another interface 1004, and is configured to support the base station 1000 in interacting in a wired manner. For example, the another interface 1004 may be an optical fiber link interface, an Ethernet interface, or a copper wire interface. For example, the base station 1000 may further include a memory 1005, where the memory 1005 stores a computer program and an instruction. The memory 1005 may be coupled to the processor 1001 and/or the transceiver 1002, and is configured to support the processor 1001 in invoking the computer program and the instruction in the memory 1005, to implement the steps related to the base station 1000 in the method provided in the embodiments of this application. In addition, the memory 1005 may be further configured to store an intermediate result in the method embodiments of this application, for example, a signal obtained after CDD weighted processing.

Figure 11:
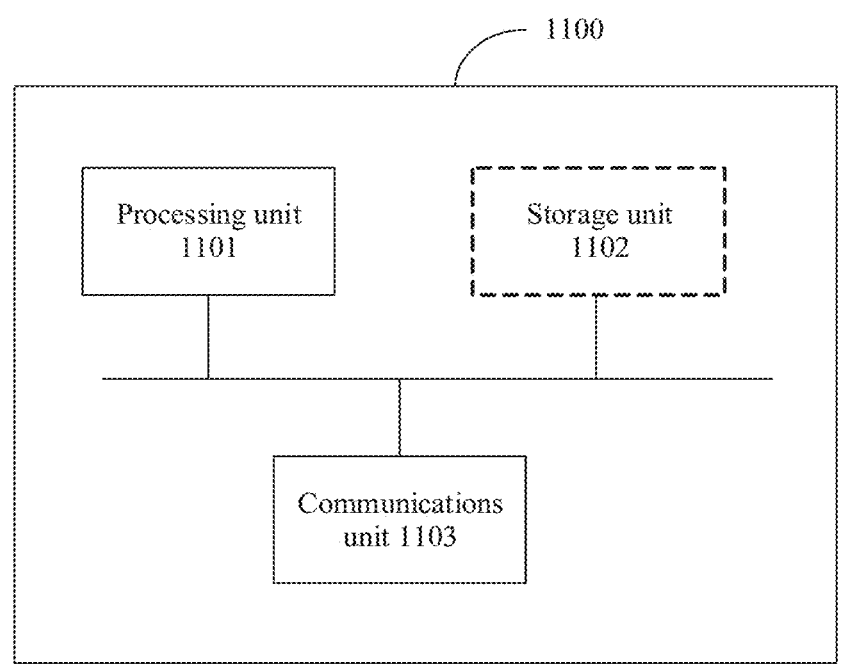
FIG. 11 is a schematic structural diagram of another communications apparatus according to an embodiment of this application.

The following describes another communications apparatus 1100 provided in an embodiment of this application. As shown in FIG. 11:

The communications apparatus 1100 may include a processing unit 1101 and a communications unit 1103. Optionally, the communications apparatus 1100 may further include a storage unit 1102. The processing unit 1101, the communications unit 1103, and the storage unit 1102 are connected via a communications bus.

The communications unit 1103 may be an apparatus that has a transceiver function, and is configured to communicate with another network device or a communications network.

The storage unit 1102 may include one or more memories. The memory may be a component configured to store a program or data in one or more devices or circuits.

The storage unit 1102 may exist independently, and is connected to the processing unit 1101 via the communications bus. The storage unit may alternatively be integrated into the processing unit 1101.

The communications apparatus 1100 may be used in a communications device, a circuit, a hardware assembly, or a chip.

The communications apparatus 1100 may be a base station in this embodiment of this application. A schematic diagram of the base station may be shown in FIG. 10. Optionally, the communications unit 1103 of the apparatus 1100 may include an antenna and a transceiver of the base station, for example, the antenna 1003 and the transceiver 1002 in FIG. 10.

The communications apparatus 1100 may be a chip in the base station in the embodiments of this application, for example, a chip in the base station 1000. The communications unit 1103 may be an input or output interface, a pin, a circuit, or the like. Optionally, the storage unit 1102 may store a computer-executable instruction of a method on a base station side, so that the processing unit 1101 performs a method performed by the base station in the foregoing embodiments. The storage unit 1102 may be a register, a cache, a random access memory (RAM), or the like, and the storage unit 1102 may be integrated with the processing unit 1101. The storage unit 1102 may be a read-only memory (ROM) or another type of static storage device that can store static information and an instruction. The storage unit 1102 may be independent of the processing unit 1101. Optionally, with development of wireless communications technologies, the transceiver may be integrated into the communications apparatus 1100. For example, the transceiver 1002 is integrated into the communications unit 1103.

When the communications apparatus 100 is the base station or the chip in the base station in the embodiments of this application, the method performed by the base station in the foregoing embodiments can be implemented. For example, the processing unit 1101 may generate a first signal, perform CDD weighted processing on the first signal to obtain a second signal, and perform densified beam weighted processing on the second signal to obtain a third signal. For example, the communications unit 1103 may send the third signal, or may send the third signal to a terminal device.

In another form of this embodiment, a computer-readable storage medium is provided. The computer-readable storage medium stores an instruction. When the instruction is executed, the method performed by the base station in the foregoing method embodiments is performed.

In another form of this embodiment, a computer program product that includes an instruction is provided. When the instruction is executed, the method performed by the base station in the foregoing method embodiments is performed.

It should be understood that the processor mentioned in the embodiments of the present invention may be a central processing unit (CPU), or may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

It should further be understood that the memory in the embodiments of the present invention may be a volatile memory or a nonvolatile memory, or may include a volatile memory and a nonvolatile memory. The nonvolatile memory may be a read-only memory (ROM), a programmable ROM (PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. According to description that is used as an example instead of a limitation, many forms of RAMs are available, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, or the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of the process and/or the block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded on the computer or another programmable data processing device, so that a series of operation steps are performed on the computer or the another programmable device to produce processing implemented by the computer. Therefore, the instructions executed on the computer or the another programmable device provide steps for implementing the specific function in the one or more processes in the flowcharts and/or in the one or more blocks in the block diagrams.

Although some possible embodiments of this application is described, a person skilled in the art can make changes and modifications to the embodiments once the basic inventive concept is learnt. Therefore, the following claims are intended to be construed to cover the embodiments of this application and all changes and modifications falling within the scope of this application.

It is clear that a person skilled in the art can make various modifications and variations to this application without departing from the spirit and scope of this application. If these modifications and variations of this application fall within the scope of the claims of this application and their equivalent technologies, this application is also intended to cover these modifications and variations.

What is claimed is:

1. A communication method, comprising:
generating, by a base station, a first signal;
performing, by the base station, cyclic delay diversity (CDD) weighted processing on the first signal to obtain a second signal;
performing, by the base station, densified beam weighted processing on the second signal to obtain a third signal; and
sending, by the base station, the third signal; and
wherein the second signal and the first signal satisfy:

$$s_{CDD}(k) = \begin{bmatrix} 1 \\ e^{j(\theta(k))} \end{bmatrix} * s(k),$$

wherein $S_{CDD}(k)$ is the second signal, wherein $s(k)$ is the first signal, wherein $$\begin{bmatrix} 1 \\ e^{j(\theta(k))} \end{bmatrix}$$

is a CDD weight matrix, wherein $$\theta(k) = 2\pi D \frac{k}{N_{FFT}}, k = 0, 1, \ldots, N_{FFT} - 1,$$

wherein D is a delay length and wherein $N_{FFT}$ is a Fast Fourier Transformation (FFT) length.

2. The method according to claim 1, wherein a value of D is one or two time domain sampling points.

3. The method according to claim 1, wherein the third signal and the second signal satisfy:

$$s_{Out}(k) = \begin{bmatrix} W(m) & 0 \\ 0 & W(m) \end{bmatrix} * s_{CDD}(k),$$

wherein $s_{out}(k)$ is the third signal, wherein $$\begin{bmatrix} W(m) & 0 \\ 0 & W(m) \end{bmatrix}$$

is a beam weight matrix, wherein $$W(m) = \begin{bmatrix} 1 & e^{j\frac{2\pi m}{Q*N}} & e^{j\frac{4\pi m}{Q*N}} & \ldots & e^{j\frac{2\pi m(N-1)}{Q*N}} \end{bmatrix},$$

wherein m represents a beam number, wherein m=1,2, . . . , wherein Q*N, wherein N represents a total quantity of transmit antennas, and wherein Q is a beam densification multiple.

4. The method according to claim 3, wherein a value of Q is 2.

5. A communications apparatus, comprising:
at least one processor; and
one or more memories coupled to the at least one processor and storing programming instructions for execution by the at least one processor to:
generate a first signal;
perform cyclic delay diversity (CDD) weighted processing on the first signal to obtain a second signal;
perform densified beam weighted processing on the second signal to obtain a third signal; and
send the third signal; and
wherein the second signal and the first signal satisfy:

$$s_{CDD}(k) = \begin{bmatrix} 1 \\ e^{j(\theta(k))} \end{bmatrix} * s(k),$$

wherein $S_{CDD}(k)$ is the second signal, wherein $s(k)$ is the first signal, wherein $$\begin{bmatrix} 1 \\ e^{j(\theta(k))} \end{bmatrix}$$

is a CDD weight matrix, wherein $$\theta(k) = 2\pi D \frac{k}{N_{FFT}}, k = 0, 1, \ldots, N_{FFT} - 1,$$

wherein D is a delay length and wherein $N_{FFT}$ is a Fast Fourier Transformation (FFT) length.

6. The apparatus according to claim 5, wherein a value of D is one or two time domain sampling points.

7. The apparatus according to claim 5, wherein the third signal and the second signal satisfy:

$$s_{out}(k) = \begin{bmatrix} W(m) & 0 \\ 0 & W(m) \end{bmatrix} * s_{CDD}(k),$$

wherein $s_{out}(k)$ is the third signal, wherein $$\begin{bmatrix} W(m) & 0 \\ 0 & W(m) \end{bmatrix}$$

is a beam weight matrix, wherein $$W(m) = \begin{bmatrix} 1 & e^{j\frac{2\pi m}{Q*N}} & e^{j\frac{4\pi m}{Q*N}} & \cdots & e^{j\frac{2\pi m(N-1)}{Q*N}} \end{bmatrix},$$

wherein m represents a beam number, wherein m=1,2, ..., wherein Q*N, wherein N represents a total quantity of transmit antennas, and wherein Q is a beam densification multiple.

8. The apparatus according to claim 7, wherein a value of Q is 2.

9. A non-transitory computer-readable storage medium, wherein the non-transitory computer-readable storage medium stores computer software instructions for execution by at least one processor to:
   generate a first signal;
   perform cyclic delay diversity (CDD) weighted processing on the first signal to obtain a second signal;
   perform densified beam weighted processing on the second signal to obtain a third signal; and
   send the third signal; and
   wherein the second signal and the first signal satisfy:

$$s_{CDD}(k) = \begin{bmatrix} 1 \\ e^{j(\theta(k))} \end{bmatrix} * s(k),$$

wherein $S_{CDD}(k)$ is the second signal, wherein s(k) is the first signal, wherein $$\begin{bmatrix} 1 \\ e^{j(\theta(k))} \end{bmatrix}$$

is a CDD weight matrix, wherein $$\theta(k) = 2\pi D \frac{k}{N_{FFT}}, k = 0, 1, \ldots N_{FFT} - 1,$$

wherein D is a delay length and wherein $N_{FFT}$ is a Fast Fourier Transformation (FFT) length.

10. The non-transitory computer-readable storage medium according to claim 9, wherein a value of D is one or two time domain sampling points.

11. The non-transitory computer-readable storage medium according to claim 9, wherein the third signal and the second signal satisfy:

$$s_{out}(k) = \begin{bmatrix} W(m) & 0 \\ 0 & W(m) \end{bmatrix} * s_{CDD}(k),$$

wherein $s_{out}(k)$ is the third signal, wherein $$\begin{bmatrix} W(m) & 0 \\ 0 & W(m) \end{bmatrix}$$

is a beam weight matrix, wherein $$W(m) = \begin{bmatrix} 1 & e^{j\frac{2\pi m}{Q*N}} & e^{j\frac{4\pi m}{Q*N}} & \cdots & e^{j\frac{2\pi m(N-1)}{Q*N}} \end{bmatrix},$$

wherein m represents a beam number, wherein m=1,2, ..., wherein Q*N, wherein N represents a total quantity of transmit antennas, and wherein Q is a beam densification multiple.

12. The non-transitory computer-readable storage medium according to claim 11, wherein a value of Q is 2.

* * * * *